(12) United States Patent
Cheng (10) Patent No.: US 10,190,545 B2
(45) Date of Patent: Jan. 29, 2019

(54) FUEL-SAVING DEVICE

(71) Applicants: Yi-Fu Cheng, Changhua, Changhua County (TW); Hung-Jiun Cheng, Changhua, Changhua County (TW); Aldwin Investment Co., Ltd., Changhua, Changhua County (TW)

(72) Inventor: Meng-Song Cheng, Changhua (TW)

(73) Assignee: Yi-Fu Cheng, Hung-Jiun Cheng & Aldwin Investment Co., Ltd., Changhua County (TW)

( * ) Notice: Subject to any disclaimer, the term of this patent is extended or adjusted under 35 U.S.C. 154(b) by 10 days.

(21) Appl. No.: 15/688,691

(22) Filed: Aug. 28, 2017

(65) Prior Publication Data

US 2018/0058392 A1 Mar. 1, 2018

(30) Foreign Application Priority Data

Aug. 31, 2016 (TW) .............................. 105128003 A (51) Int. Cl.
| | |
|---|---|
| *F02B 51/06* | (2006.01) |
| *F02M 27/04* | (2006.01) |
| *C10L 1/02* | (2006.01) |
| *C10L 10/00* | (2006.01) |
| *C10G 35/04* | (2006.01) |

(52) U.S. Cl.
CPC .............. *F02M 27/04* (2013.01); *C10G 35/04* (2013.01); *C10L 1/02* (2013.01); *C10L 10/00* (2013.01)

(58) Field of Classification Search
CPC  F02M 27/04; C10G 35/04; C10L 1/02; C10L 10/00
USPC ......................................................... 123/538
See application file for complete search history.

(56) References Cited

U.S. PATENT DOCUMENTS

| | | | | |
|---|---|---|---|---|
| 8,967,119 | B2* | 3/2015 | Wey ........................ | F02B 51/06 |
| | | | | 123/445 |
| 2009/0120416 | A1* | 5/2009 | Wey ........................ | F02M 27/04 |
| | | | | 123/538 |
| 2016/0104831 | A1* | 4/2016 | Xu .......................... | H01L 37/02 |
| | | | | 136/201 |

FOREIGN PATENT DOCUMENTS

| | | |
|---|---|---|
| CN | 1671995 A | 9/2005 |
| CN | 102588158 A | 7/2012 |
| TW | M471455 U | 2/2014 |
| TW | 201509408 A | 3/2015 |

* cited by examiner

*Primary Examiner* — Marguerite McMahon
(74) *Attorney, Agent, or Firm* — Lewis Roca Rothgerber Christie LLP (57) ABSTRACT

A fuel-saving device for treating a fuel includes at least one pyroelectric element to be in contact with the fuel. The at least one pyroelectric element includes a high molecular polymer substrate and a plurality of polarized pyroelectric particles dispersed in the polymer substrate. The polarized pyroelectric particle has infrared absorption peaks at wavenumber ranging from 430 $cm^{-1}$ to 980 $cm^{-1}$ and from 1600 $cm^{-1}$ to 2700 $cm^{-1}$.

11 Claims, 10 Drawing Sheets

FUEL-SAVING DEVICE

CROSS-REFERENCE TO RELATED APPLICATION

This application claims priority of Taiwanese Patent Application No. 105128003, filed on Aug. 31, 2016.

FIELD

The disclosure relates to a fuel-saving device, and more particularly to a fuel-saving device having a pyroelectric element.

BACKGROUND

In recent years, many consumers have sought to find ways to reduce vehicle fuel consumption due to extreme volatility in crude oil prices. As such, fuel-saving devices began to prevail, many of which are mounted on a connecting pipe between the tank and the engine of the vehicle.

There are many ways for the fuel-saving devices to achieve fuel conservation, such as feeding oxygen gas and hydrogen gas which are separated by electrolyzing water into an engine to increase the oxygen supply and a new fuel of hydrogen, or the usage of direct current (DC) under high voltage in the car to ionize the air to form ozone ($O_3$) for subsequent entry into the engine to improve the oxygen supply. However, all these conventional fuel-saving methods or devices incurred high cost, and the resultant fuel efficiency is not cost-justified.

SUMMARY

Therefore, an object of the disclosure is to provide a fuel-saving device for treating a fuel that can alleviate at least one of the drawbacks of the prior art.

According to the disclosure, the fuel-saving device includes at least one pyroelectric element that is to be in contact with the fuel and that includes a polymer substrate and a plurality of polarized pyroelectric particles dispersed in the polymer substrate. The polarized pyroelectric particles have infrared absorption peaks at wavenumber ranging from 430 $cm^{-1}$ to 980 $cm^{-1}$ and from 1600 $cm^{-1}$ to 2700 $cm^{-1}$.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
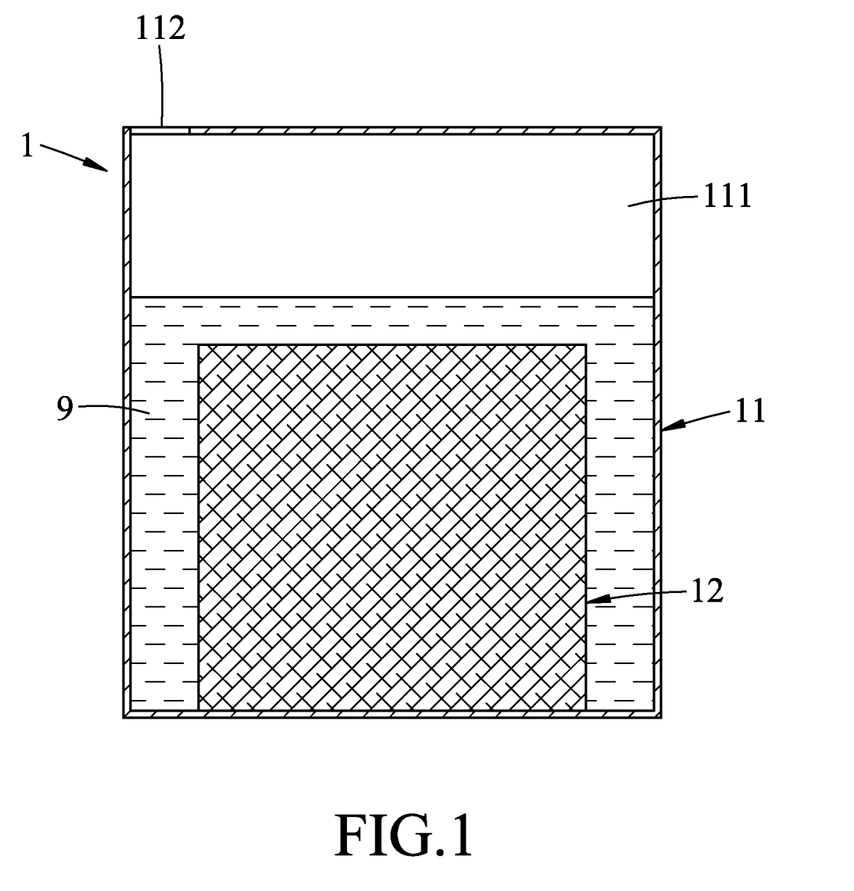
FIG. 1 is a schematic sectional view illustrating a first embodiment of a fuel-saving device of this disclosure.
Figure 2:
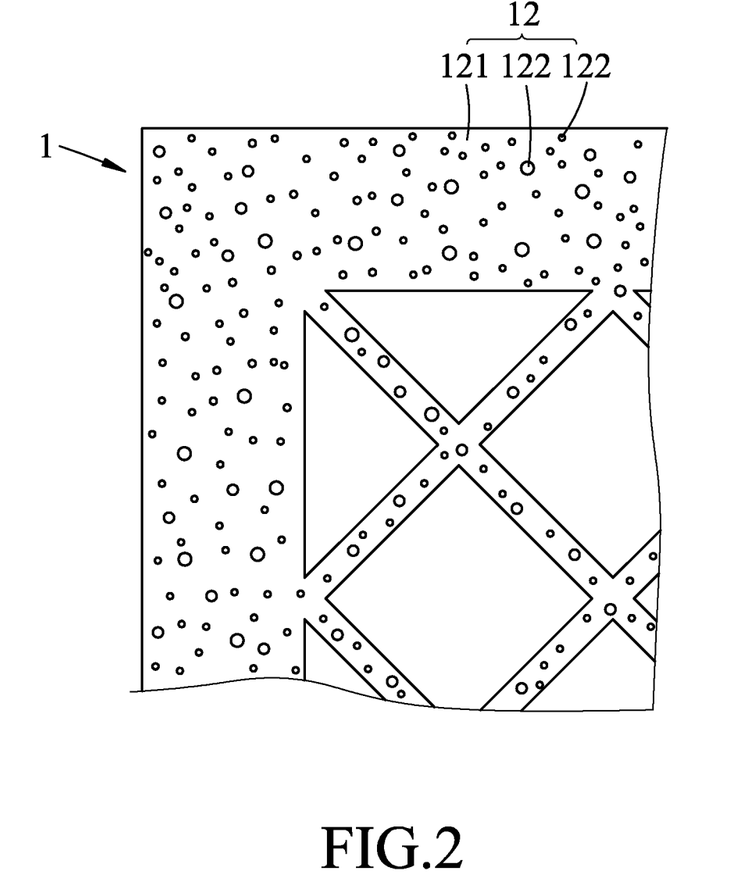
FIG. 2 is a fragmentary schematic view illustrating a pyroelectric element of the first embodiment.

Referring to FIGS. 1 to 2, a first embodiment of a fuel-saving device 1 suitable for treating fuel 9 according to the present disclosure includes a receiving body 11 and at least one pyroelectric element 12 that is to be in contact with the fuel 9. In this embodiment, the fuel-saving device 1 is an oil barrel.

The receiving body 11 may have a shape of a square barrel, and includes a receiving space 111 and an inlet 112 for introducing the fuel 9 into the receiving space 111. The at least one pyroelectric element 12 is disposed in the receiving space 111.

The at least one pyroelectric element 12 includes a polymer substrate 121 and a plurality of polarized pyroelectric particles 122 dispersed in the polymer substrate 121. The pyroelectric element 12 may be prepared by homogeneously mixing the polymer substrate 121 and the polarized pyroelectric particles 122 and then solidifying the resultant mixture. The polarized pyroelectric particles 122 may be prepared by refining a pyroelectric material and then subjecting the obtained pyroelectric particles to a polarization treatment using a high-voltage electric field ranging between $10^5$ and $10^7$ V/m. The polarized pyroelectric particles 122 have absorption peaks valued at wavenumber ranging from 430 $cm^{-1}$ to 980 $cm^{-1}$ and 1600 $cm^{-1}$ to 2700 $cm^{-1}$ in the infrared absorption spectrum measurement.

In certain embodiments, the polarization treatment is adjusted with changes in the electric currents read via an ammeter. When an instant surge of the current (measured in amperes) occurs, it indicates that the intensity has reached an extent that is sufficient to penetrate the material (i.e. exceeding the saturated polarized electric field of the pyroelectric particles), and then around a 3-5% amount of the electric field applied should be withdrawn (i.e. substantially close to the saturated polarized electric field of the pyroelectric particles). The spontaneous polarization intensity of the polarized pyroelectric particles 122 could be enhanced by the electric field applied in the polarization treatment.

According to the disclosure, the pyroelectric particles may individually have a crystal structure of triclinic system, monoclinic system, orthorhombic system, trigonal system, pyramidal system or hexagonal system. Examples of the pyroelectric particles 122 suitable for use in this disclosure include, but are not limited to, calcium stearate particles, charcoal powder, boron nitride particles, boron carbide particles, magnesium hydroxide particles, silicon powder, nickel oxide particles, barium titanate particles, lead chromate particles, aluminium chromate particles, strontium titanate particles, lithium niobate particles, lithium manganite particles, zinc chromate particles, strontium chromate particles, sodium zirconium particles, calcium carbonate particles, sodium stannate particles, zirconium sulfate particles, lithium carbonate particles, and combinations thereof.

According to the disclosure, the pyroelectric element 12 may further include a plurality of catalyst particles. Examples of the catalyst particles suitable for use in this disclosure may include, but not limited to, platinum nanoparticles, palladium nanoparticles, rutherium nanoparticles, titanium nanoparticles, titanium dioxide nanoparticles, gold nanoparticles, aluminium oxide particles, zeolite particles, and combinations thereof. These catalyst particles may increase the octane number of the fuel 9 by assisting the conversion of alkanes and olefins in the fuel 9 into cyclic hydrocarbons or aromatic hydrocarbons, thereby reducing the detonation phenomenon and improving the fuel efficiency.

In this embodiment, the pyroelectric element 12 has a porous structure. The polarized pyroelectric particles 122 are uniformly distributed in the polymer substrate 121. The polarized pyroelectric particles 122 of the pyroelectric element 12 may radiate electrons, which is to be absorbed by the fuel 9 (such as hydrocarbon oil droplets), thereby activating the oil droplets (e.g. increasing potential energy) and decomposing the oil droplets into micromolecules (e.g., reducing the formation of hydrogen bonds between the oil droplets). Therefore, when the treated fuel is drawn to enter the car oil tank, the heating efficiency thereof in the engine could be improved so as to achieve the effect of fuel-saving.

Figure 3:
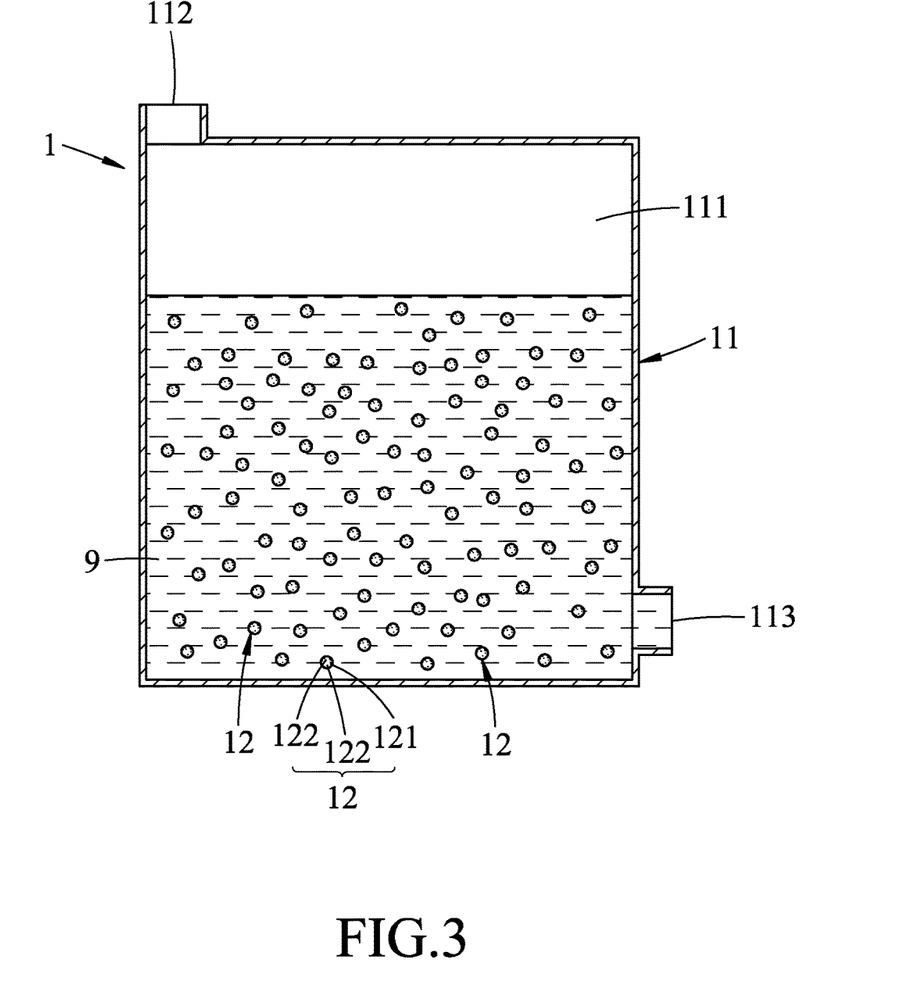
FIG. 3 is a schematic sectional view illustrating a second embodiment of the fuel-saving device of this disclosure.

Referring to FIG. 3, a second embodiment of the fuel-saving device 1 according to this disclosure is similar to that of the first embodiment, except that the receiving body 11 further includes an outlet 113 for exporting the fuel 9 and the fuel-saving device 1 includes a plurality of pyroelectric elements 12. Each of the pyroelectric elements 12 maybe in a sphere shape. The polymer substrate 121 maybe made from polypropylene (PP). In this embodiment, the fuel-saving device 1 is a fuel tank of a vehicle (such as a car). It is worth mentioning that the shape of each of the pyroelectric element 12 is not limited to a spherical or a regular geometric shape, as it may be irregularly shaped as well.

Figure 4:
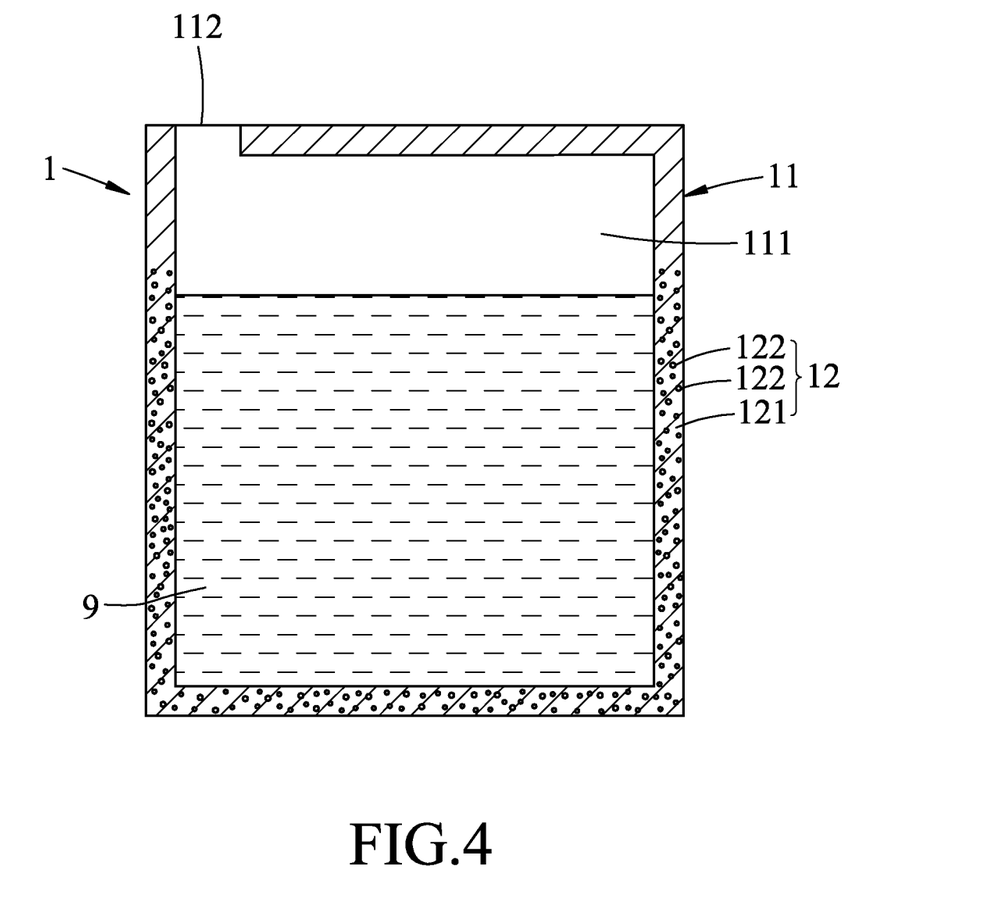
FIG. 4 is a schematic sectional view illustrating a third embodiment of the fuel-saving device of this disclosure.

Referring to FIG. 4, a third embodiment of the fuel-saving device 1 according to this disclosure is similar to that of the first embodiment, except that in this embodiment, the pyroelectric element 12 is shaped as the receiving body 11.

Figure 5:
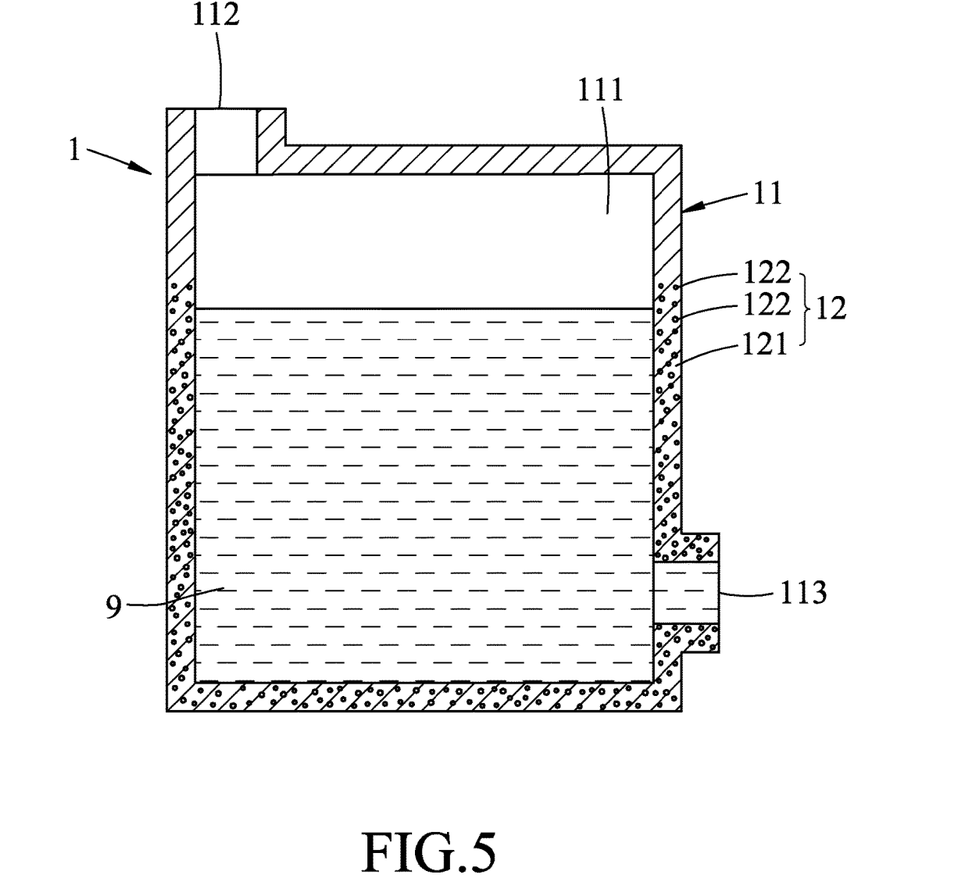
FIG. 5 is a schematic sectional view illustrating a fourth embodiment of the fuel-saving device of this disclosure.

Referring to FIG. 5, a fourth embodiment of the fuel-saving device 1 according to this disclosure is similar to that of the third embodiment, except that in this embodiment, the receiving body 11 further includes an outlet 113 for exporting the fuel 9. In this embodiment, the fuel-saving device 1 is a fuel tank of a vehicle (such as a car).

Figure 6:
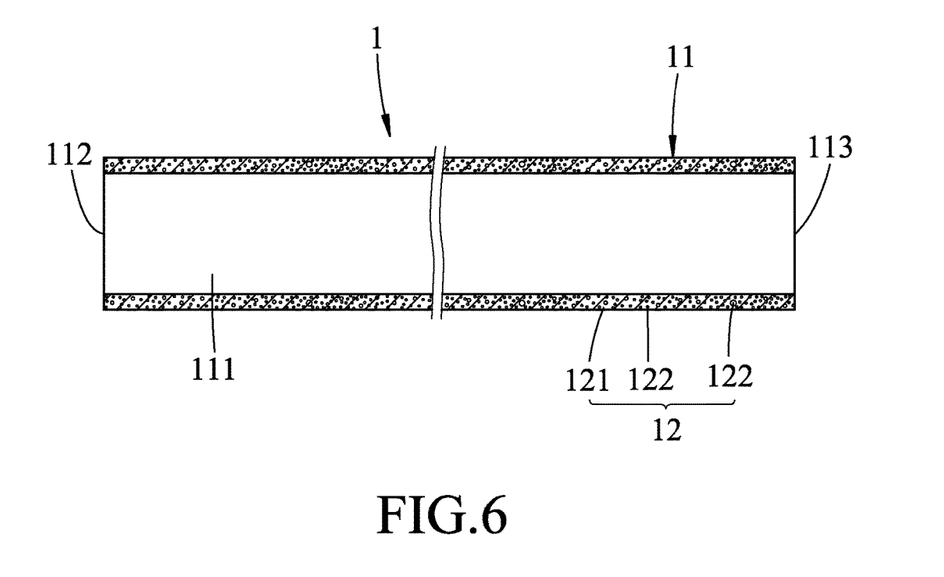
FIG. 6 is a schematic sectional view illustrating a fifth embodiment of the fuel-saving device of this disclosure.

Referring to FIG. 6, a fifth embodiment of the fuel-saving device 1 according to this disclosure is similar to that of the fourth embodiment, except that the receiving body 11 is in a tubular structure. In this embodiment, the fuel-saving device 1 is a pipeline for connecting a fuel tank (not shown in the figure) to an engine (not shown in the figure). When the fuel is transported from the fuel tank to the engine through the pipeline, the fuel 9 can be activated and decomposed into micromolecules by the polarized pyroelectric particles 112 in the pipeline, so that the heating efficiency of the fuel in the engine could be increased.

Figure 7:
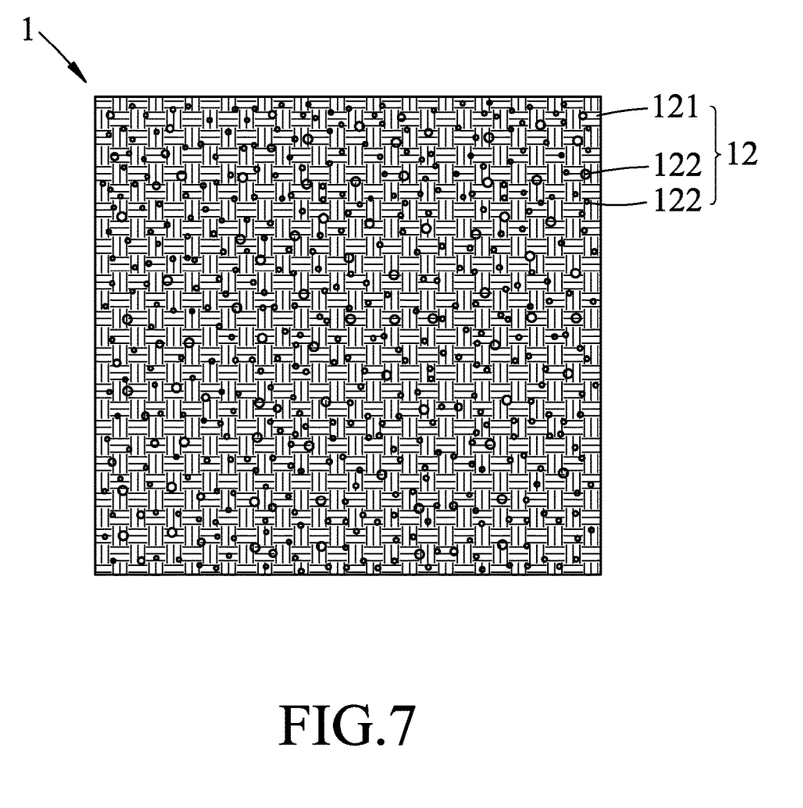
FIG. 7 is a schematic view illustrating a sixth embodiment of the fuel-saving device of this disclosure.

Referring to FIG. 7, a sixth embodiment of the fuel-saving device 1 according to this disclosure has at least one pyroelectric element 12 that includes the polymer substrate 121 and a plurality of polarized pyroelectric particles 122 dispersed in the polymer substrate 121. In this embodiment, the pyroelectric element 12 is in the form of a fabric, and is prepared by subjecting a mixture of the polymer substrate 121 and the polarized pyroelectric particles 122 to a fusion welding process followed by a wire drawing process to produce fibers. These fibers are then woven into the fabric. According to this disclosure, there is no limitation on the material of the polymer substrate 121. To achieve better results, it is preferred to choose a polar polymer material with an effective dipole moment $\mu > 0.5$. In certain embodiments, the polymer material may be nylon, polyester, polyacrylonitrile, PVC fibers, etc. The amount of the polarized pyroelectric particles 122 in the pyroelectric element 12 is not limited, as it may be adjusted according to the needs of the fuel-saving device 1. In some embodiments, the polarized pyroelectric particles 122 may be added in an amount ranging from 1 wt % to 3 wt % based on the weight of the pyroelectric element 12. In this embodiment, the fuel-saving device 1 may be mounted on an outlet of a car fuel tank, or an inlet of a car engine, so as to activate and decompose the oil droplets into micromolecules therein.

Figure 8:
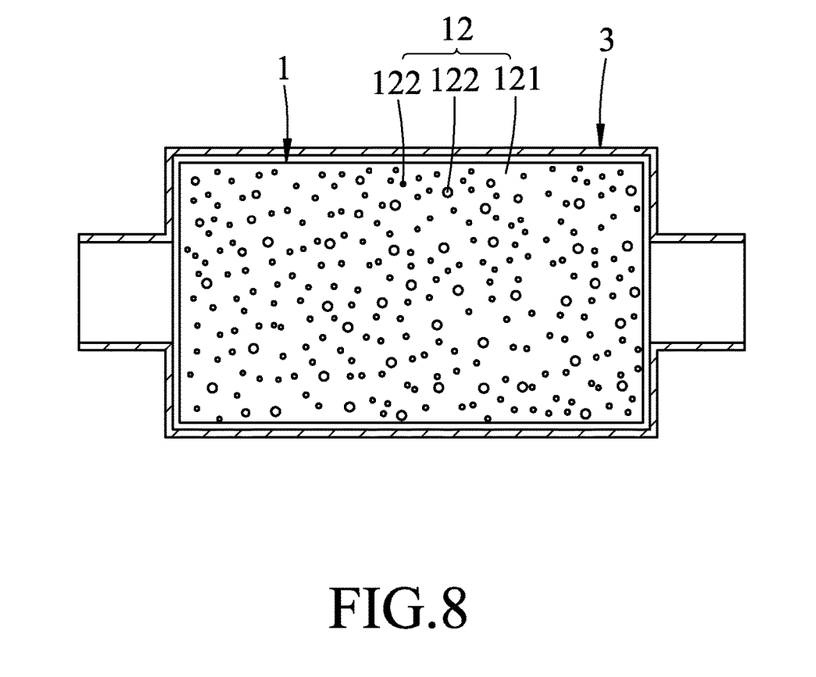
FIG. 8 is a schematic sectional view illustrating a seventh embodiment of the fuel-saving device of this disclosure.

Referring to FIG. 8, a seventh embodiment of the fuel-saving device 1 according to this disclosure is similar to that of the sixth embodiment, except that the pyroelectric element 12 is in the form of a filter, which is prepared by winding the fibers. In this embodiment, the pyroelectric element 12 may be mounted in a fuel filter assembly 3 which is disposed between a fuel tank (not shown in the figure) and an engine (not shown in the figure).

In order to determine the fuel-saving efficiency of the fuel-saving device 1 according to this disclosure, the diesel cars equipped with and without the seventh embodiment of the fuel-saving devices 1 (which was mounted between a fuel tank and an engine of the diesel car), were subjected to the measurements for the wheel output power and the driving distance. The results were shown in Tables 1 and 2.

TABLE 1

Figure 9:
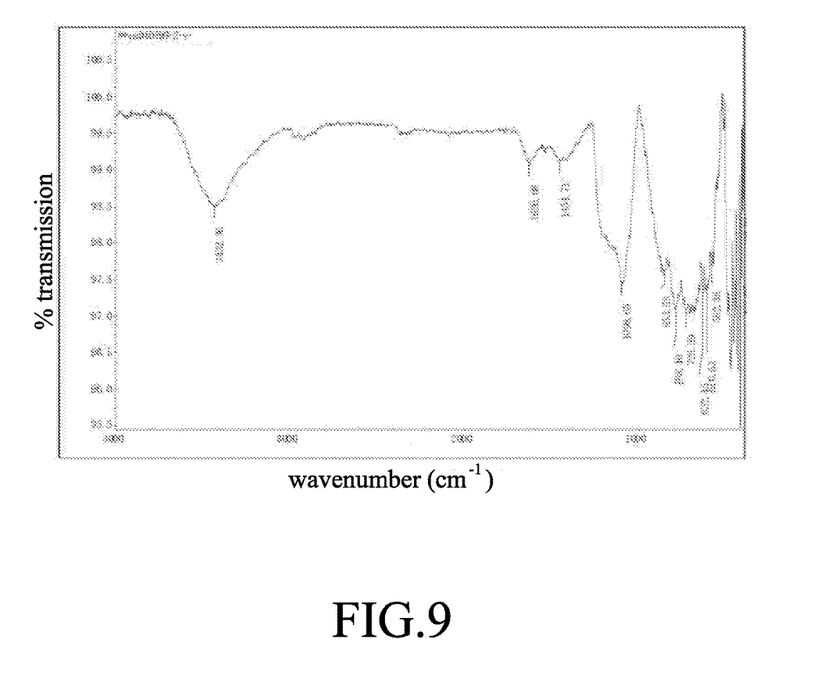
FIG. 9 is an infrared absorption spectrum of pyroelectric sample (silicone powder) from the pyroelectric element of the fuel-saving device of this disclosure.

The wheel output power for each of the diesel cars with and without the fuel-saving device was measured under fourth gear and a fixed throttle, with a vehicle speed maintained at 30 km/hr, so as to determine the power performance. In this test, the pyroelectric particles 122 used in the fuel-saving device 1 are silicon powder, and the infrared absorption spectrum thereof is shown in FIG. 9.

|  | Diesel car without the fuel-saving device | Diesel car with the fuel-saving device | Increased efficiency (%) |
|---|---|---|---|
| Average power | 37 kw | 51 kw | 37.3% |

TABLE 2

Figure 10:
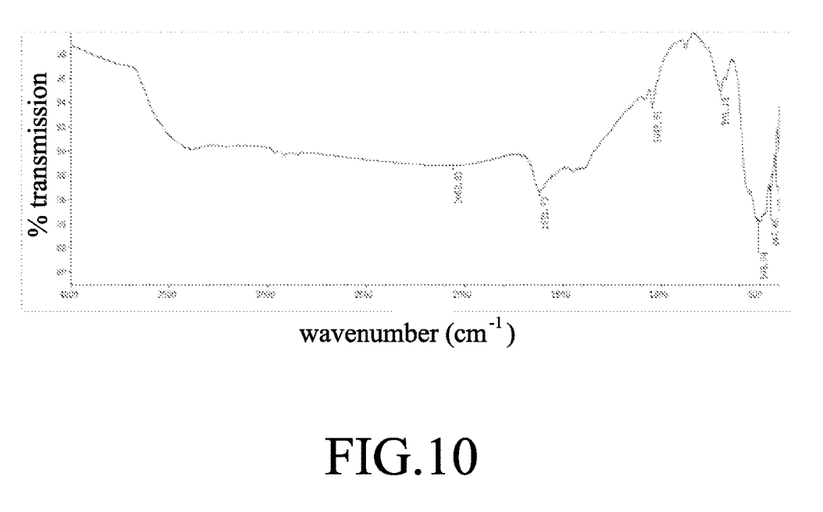
FIG. 10 is an infrared absorption spectrum of pyroelectric particles (nickel oxide particles) from the pyroelectric element of the fuel-saving device of this disclosure.

The driving distance for each of the diesel cars with and without the fuel-saving device was measured under fourth gear and an adjustable throttle, simulated to drive on a flat road surface, with a vehicle speed maintained at 30 km/hr and the fuel amount fixed to 0.5 L, so as to determine the economic values. In this test, the pyroelectric particles 122 used in the fuel-saving device 1 are nickel oxide particles and the infrared absorption spectrum thereof is shown in FIG. 10.

|  | Diesel car without the fuel-saving device | Diesel car with the fuel-saving device | Increased efficiency (%) |
|---|---|---|---|
| Driving distance | 2187 km | 2707 km | 19.2% |

In addition, the seventh embodiment of the fuel-saving device, in which the polarized pyroelectric particles 122 are silicon powder, was also mounted between a fuel tank and an engine of a fishing boat, and the exhaust gas generated by the exhaust pipe of the fishing boat was measured. For comparison, a fishing boat without the fuel-saving devices 1 was subjected to the same analysis. The results showed that the exhaust pipe of the fishing boat without the fuel-saving device 1 generated significant amount of smoke, whereas the exhaust pipe of the fishing boat with the fuel-saving device 1 generated less (data not shown), suggesting the fuel-saving device 1 of this disclosure can significantly reduce the generation of the exhaust gas, thereby preventing air pollution.

The merits of this disclosure are summarized as below.

Through the choice of pyroelectric particles 122 which have infrared absorption peak within a specific range and which were polarized by applying a high-voltage electric field for enhancing the spontaneous polarization intensity thereof, the electrons radiated by the polarized pyroelectric particles 122 can be absorbed by the oil droplets, causing their activation and decomposition, thereby increasing the heating efficiency of the fuel in the engine so as to achieve the purpose of fuel-saving.

In addition, by a fusion welding process and a wire drawing process, the pyroelectric element 12 thus prepared is able to provide a more stable piezoelectricity. The fuel-saving device 1 having the same (such as that in a form of fabric) can generate negative ions with high concentration and exhibit stable and highly efficient pyroelectric effect. Furthermore, by virtue of increasing the cross-sectional area of resonance absorption of the pyroelectric element 2, the electric charges released by the pyroelectric element 2 can efficiently be absorbed by the fuel, and hence yields a better practical value.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fuel-saving device for treating a fuel, comprising: at least one pyroelectric element that is to be in contact with the fuel and that includes a polymer substrate and a plurality of polarized pyroelectric particles dispersed in said polymer substrate, said polarized pyroelectric particles having infrared absorption peaks at wavenumber ranging from 430 $cm^{-1}$ to 980 $cm^{-1}$ and from 1600 $cm^{-1}$ to 2700 $cm^{-1}$.

2. The fuel-saving device of claim 1, wherein said pyroelectric particles individually have a crystal structure selected from the group consisting of triclinic system, monoclinic system, orthorhombic system, trigonal system, cubic system, and hexagonal system.

3. The fuel-saving device of claim 1, wherein said polarized pyroelectric particles are selected from the group consisting of calcium stearate particles, charcoal powder, boron nitride particles, boron carbide particles, magnesium hydroxide particles, silicon powder, nickel oxide particles, barium titanate particles, lead chromate particles, aluminium chromate particles, strontium titanate particles, lithium niobate particles, lithium manganite particles, zinc chromate particles, strontium chromate particles, sodium zirconate particles, calcium carbonate particles, sodium stannate particles, zirconium sulfate particles, lithium carbonate particles, and combinations thereof.

4. The fuel-saving device of claim 1, further comprising a receiving body that includes a receiving space and an inlet for introducing the fuel into said receiving space, said at least one pyroelectric element being disposed in said receiving space.

5. The fuel-saving device of claim 1, wherein said pyroelectric element is shaped as a receiving body which has a receiving space and an inlet for introducing the fuel into said receiving space.

6. The fuel-saving device of claim 5, wherein said receiving body is in the shape of a tube.

7. The fuel-saving device of claim 1, wherein said at least one pyroelectric element is prepared by a fusion welding process followed by a wire drawing process.

8. The fuel-saving device of claim 1, wherein said at least one pyroelectric element is in the form of a fabric.

9. The fuel-saving device of claim 1, wherein said at least one pyroelectric element is in the form of a filter.

10. The fuel-saving device of claim 1, wherein said at least one pyroelectric element further includes a plurality of catalyst particles.

11. The fuel-saving device of claim 10, wherein said catalyst particles are selected from the group consisting of platinum nanoparticles, palladium nanoparticles, rutherium nanoparticles, titanium nanoparticles, titanium dioxide nanoparticles, gold nanoparticles, aluminium oxide particles, zeolite particles, and combinations thereof.

\* \* \* \* \*